Feb. 3, 1931.   F. H. HAGUE   1,791,025
STEERING GEAR, MORE ESPECIALLY TO STEERING GEAR FOR MOTOR ROAD VEHICLES
Filed May 6, 1929   2 Sheets-Sheet 2
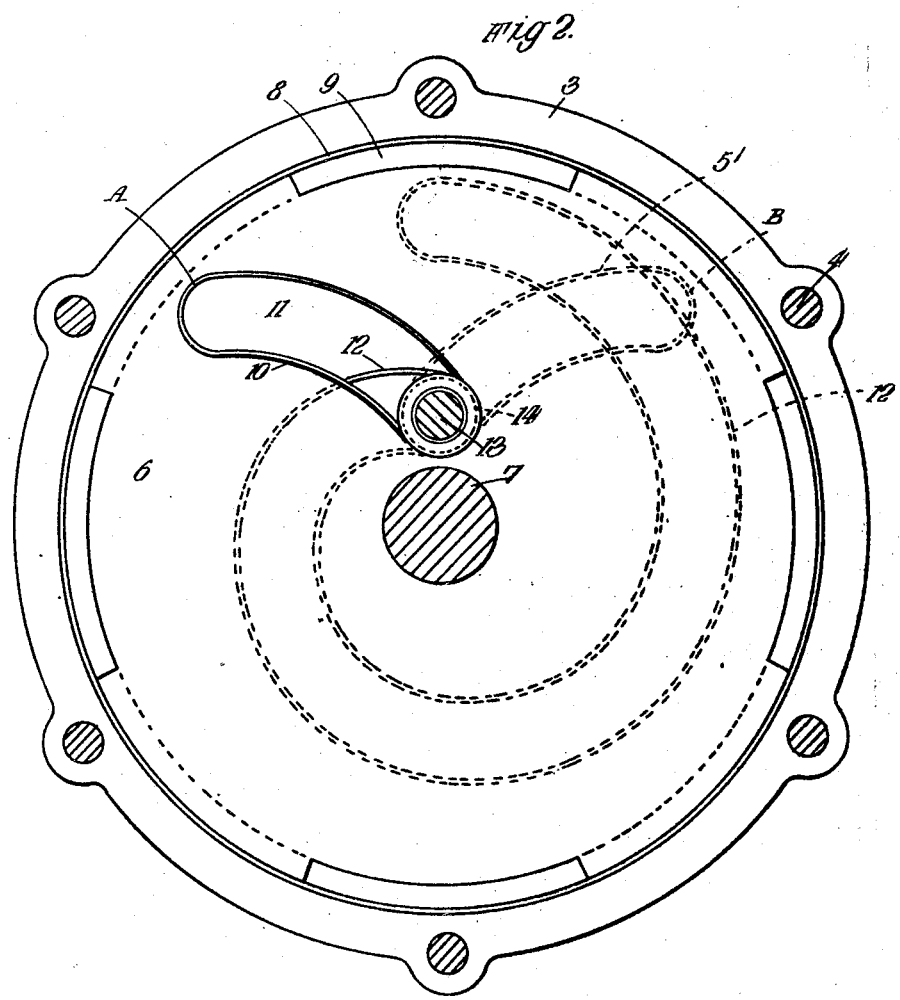
FRANK HOWARD HAGUE
INVENTOR;

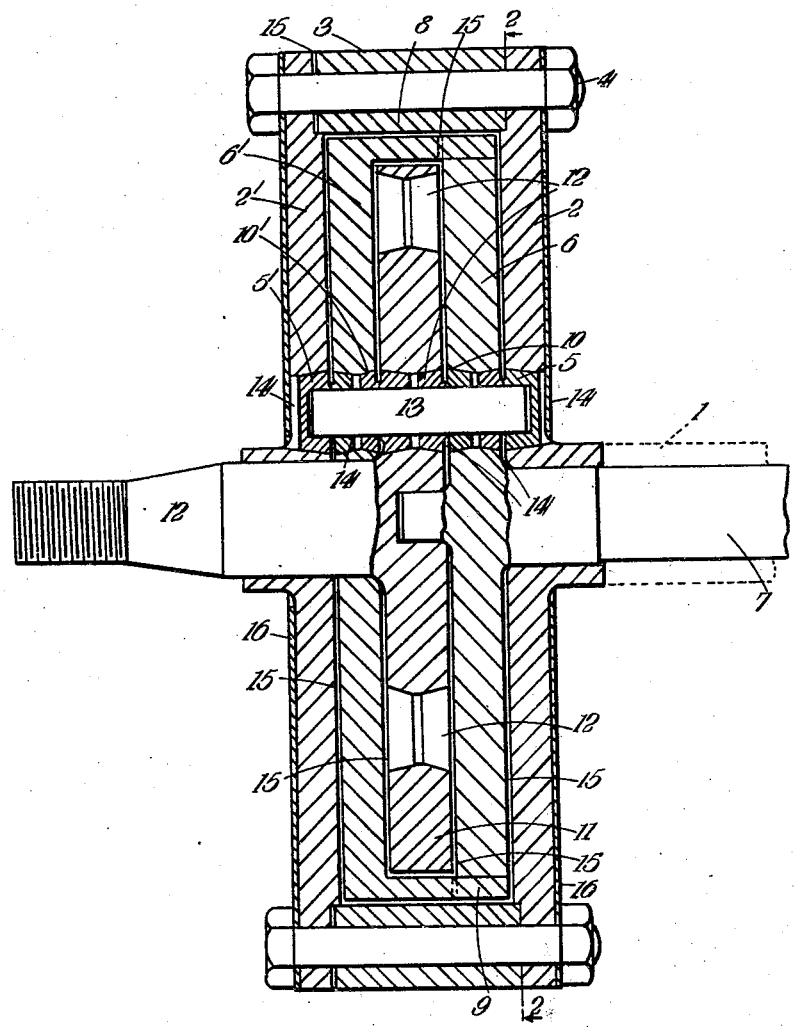

Patented Feb. 3, 1931

1,791,025

UNITED STATES PATENT OFFICE

FRANK HOWARD HAGUE, OF LONDON, ENGLAND

STEERING GEAR, MORE ESPECIALLY TO STEERING GEAR FOR MOTOR ROAD VEHICLES

Application filed May 6, 1929, Serial No. 360,802, and in Great Britain May 14, 1928.

The present invention relates to steering gear. More especially it relates to steering gear for motor road vehicles, wherein a manually operated steering wheel or the like is employed and some form of reduction gear provided between the said wheel and the road wheels, such that the angular movement of the road wheels is less than the angular movement of the steering wheels. The invention will be described for convenience with reference to motor road vehicles only but it will be readily understood from the description that it may be employed for steering other vehicles such for example as motor boats.

According to the invention the steering wheel is integral with or operatively connected with an element such as a disc or plate, or cam (hereinafter referred to as the steering wheel cam) which moves angularly in its own plane on movement of the steering wheel. The said steering wheel cam is formed or provided with a track, such for example as a groove or slot which or a part or parts of which lies or lie in a direction having both radial and circumferential components in relation to the axis of rotation of the said cam, such for example as a spirally curved or scroll-like track. Mounted in association with the steering wheel cam and parallel therewith are two other elements such as plates or discs one of which is fixed (hereinafter termed the fixed disc) and the other of which (hereinafter termed the steering shaft disc) is rotatable about the geometrical axis of movement of the steering wheel cam and rigidly connected with the steering column shaft or like element through which the actuation of the steering road wheels is effected. The fixed disc and the steering shaft disc are each provided with a track such for example as a slot or groove lying in directions having both radial and circumferential components in relation to the common geometrical axis of movement of the steering wheel cam and the steering shaft disc and reversely inclined or intersecting when superposed, or the track in one of the said discs may lie in a direction as indicated and the other in a radial direction. There is also provided a common member slidably engaged by all three of the tracks referred to, whereby on the steering wheel cam being rotated the said member is caused to move along the track in the fixed disc in a radial direction or in a direction having a radial component and in consequence of the said member also engaging the inclined track in the steering shaft disc the latter is caused to move angularly in relation to the fixed disc. The curves and directions of the several tracks are preferably so designed and interrelated that the action is irreversible, that is to say motion can be transmitted to the steering wheel shaft by rotation of the steering wheel but not from the steering shaft to the steering wheel.

In order that the invention may be more fully understood and readily carried into effect it will now be described with reference to the accompanying drawings which illustrate one constructional form thereof. In these drawings, Figure 1 is an axial section through the steering gear and Figure 2 is a face view with one outer disc removed, on the lines 2—2 of Figure 1. In the form of the invention shown there is rigidly mounted in any convenient manner at the top of a hollow steering column 1 and concentric therewith a laterally disposed cylindrical box comprising two circular plates 2, 2′ spaced apart by a cylindrical ring 3, and connected by suitable fastening means such for example as bolts and nuts 4. These two plates 2, 2′ are each provided with a curved slot 5, 5′ extending from a point near the centre to a point near the periphery and lying generally in a direction having both radial and circumferential components, that is to say in a direction inclined to any radius traversing the slot. The slot 5 of the plate 2 is exactly opposite to the slot 5′ of the other plate 2′ and the two plates with their slots constitute the fixed disc hereinbefore referred to. The disposition of the said slots is clearly shown in Figure 2 where there is indicated in dotted lines the slot 5′ of the plate 2′, the other plate 2 being assumed in Figure 2 to have been removed. Within the cylindrical box referred to is mounted another cylindrical box-like arrangement comprising a circular plate 6 rigidly mounted upon the top of the steering shaft 7 and another circular plate 6' with an annular flange 8 spaced from the first mentioned plate 6 and connected therewith by castellations 9 upon the edge of the annular flange 8 co-acting with notches formed in the edge of the plate 6 attached to the steering shaft 7. These two plates 6 and 6' so connected constitute the steering shaft disc above referred to and they are provided with slots 10, 10' similar to the slots 5, 5' just described as being provided in the plates 2 and 2', but reversely inclined, or in other words so inclined that they intersect with the first mentioned slot 5, 5' when superposed. The slot 10 in the plate 6 and its disposition appear clearly in Figure 2 and it will be understood that the other slot 10' lies exactly behind the slot 10. Within the second mentioned cylindrical box constituted by the plates 6, 6' and the flange 8 there is disposed another disc 11 which is integral with a spindle 12 extending upwards through suitable orifices in the plates 6' and 2' above it and to the top of which spindle the manually operable steering wheel is attached. This central cylindrical plate 11 is provided with a spiral or scroll-like slot 12 extending from a point near the centre to a point near the periphery and occupying an angular extent of about 360 degrees. This central plate 11 constitutes the steering wheel cam above referred to. Extending through the said spiral or scroll and also through the slots 5, 10, 10', 5' of all the circular plates referred to is a pin 13 provided with coned rollers 14 which are a working fit within the said spiral or scroll 12 and the various slots.

Thus on rotation of the steering wheel the pin with its rollers will be moved in a direction following that of the slots in the fixed disc, that is to say the slots in the plates 2 and 2', and owing to the fact that it also engages in the slots in the steering shaft disc that is to say in the plates 6 and 6' the latter will be rotated in relation to the former as the point of intersection of the two slots is altered by movement of the pin through the action of the cam slot or scroll 12. The general arrangement of the scroll and slots as shown is such it will be seen that a complete revolution of the steering wheel in clockwise direction as seen in Figure 2 results in an angular movement of the steering shaft disc from the point A to the point B, that is to say through about 90 degrees.

The scroll may be so plotted that about midway of its angular extent corresponding with the straight steering position a relatively large movement of the steering wheel effects a relatively small movement of the steering shaft while on either side of this central position the curvature of the scroll may be so varied that the ratio of angular movement of the steering wheel to angular movement of the steering shaft is progressively decreased. The several plates of the construction described are provided with clearances as at 15 which in conjunction with the coned form of the rollers and correspondingly shaped faces of the slots and scroll enable wear to be taken up by removing shims or thin washers from the clearance 15 and tightening up the bolts and nuts 4. Thin cover plates 16 are also provided to complete the assembly and to cover the open sides of the slots in the outer plates 2 and 2'.

In the foregoing description of the construction illustrated in the drawings it has been stated that the box-like assembly comprising the plates 2, 2' etc., is mounted rigidly upon the upper end of a hollow steering column. This part of the assembly may however be fixed in any other convenient manner; thus for example by means of suitable lugs or brackets it might be attached to the dash board or scuttle of a motor vehicle or it could be placed at the lower end of the steering column or in any other convenient position axially aligned with the steering column and shaft.

Suitable lightening holes or recesses may of course be provided in any or all of the various plates constituting the gear.

As mentioned above, with the cam spiral or scroll 12 and the slots 5, 5', 10, 10' as shown, a complete revolution of the steering wheel cam effects a movement of about 90 degrees of the steering shaft disc. If a spiral or scroll sloped more steeply to the axis be chosen, the angular movement of the steering wheel cam for given angular movement of the steering shaft disc would be reduced. A relatively "slow" slope to the spiral or scroll 12 however gives the irreversible feature and a desirable reduction gearing between the steering wheel cam and the steering shaft disc. To secure the self locking feature it will be seen that for any position of the parts for example the position indicated by Figure 2, the angle between the tangent to the slots 5 and 5' of the "fixed disc" at the position of the pin and rollers 13, 14, and the normal to the tangent to the wall of the cam spiral or scroll 12 at the point of contact with the said pin and rollers, must be less than the "angle of friction" of the science of mechanics. Generally speaking to secure the irreversible feature the various slots are so chosen that the direction of pressure and reaction, as determined by the slots 5, 5', between the pin and rollers and the wall of the cam spiral or scroll slot is approximately normal to the tangent to the curve of the said spiral or scroll at the point of contact.

Different relationships between the angular movement of the steering wheel cam and the steering shaft disc may be obtained by selecting different curves for the spiral or scroll or the slots 5, 5', 10, 10', or both, and in one and the same gear the relationships may vary at different relative angular positions of the steering wheel cam and the steering shaft disc. The curves necessary to secure the relationships desired may be obtained readily by geometrical plotting methods.

I claim:—

1. Steering gear comprising two disc-like elements co-axially mounted, tracks in the said elements which intersect at different points in their length and at different radial distances from the common axis with variation of the angular relation of the said disc-like elements, a member slidably and simultaneously engaging both said tracks at their intersection, and operating means for varying the radial distance of the said member from the common axis to cause relative rotation between the two disc-like elements to effect the steering operation.

2. Steering gear comprising a fixed disc and a steering shaft disc mounted co-axially, tracks in the fixed disc and steering shaft disc which intersect at different points in their length and at different radial distances from the common axis with variation of the angular relation of the said fixed disc and steering shaft disc, a member slidably and simultaneously engaging both said tracks, and operating means rotatable about the common axis for varying the radial distance of the said member from the common axis to cause rotation of the steering shaft disc relatively to the fixed disc.

3. Steering gear comprising a steering wheel cam provided with a track lying in a direction having both radial and circumferential components, a fixed disc and a steering shaft disc mounted co-axially therewith, tracks in the fixed disc and steering shaft disc which intersect at different points in their length and at different radial distances from the common axis with variation of the angular relation of the said fixed disc and steering shaft disc and which also intersect the track in the steering wheel cam, and a member slidably and simultaneously engaging all three tracks at their intersection whereby on rotation of the steering wheel cam the radial distance of the said member from the common axis is varied to cause rotation of the steering shaft disc relatively to the fixed disc.

4. Steering gear comprising two disc-like elements co-axially mounted, each said element having a track lying in a direction having both radial and circumferential components the two said tracks intersecting when superposed, a member slidably and simultaneously engaging both said tracks at their intersection, and operating means for varying the radial distance of the said member from the common axis to cause relative rotation between the two disc-like elements to effect the steering operation.

5. Steering gear comprising two disc-like elements co-axially mounted, tracks in the said elements which intersect at different points in their length and at different radial distances from the common axis with variation of the angular relation of the said elements, a member slidably and simultaneously engaging both said tracks at their intersection and operating means rotatable about the common axis and having a spiral groove engaging the said member whereby on rotating the operating means in one direction or the other the said member is moved radially in one direction or the other to vary the distance of the point of intersection of the tracks in the said disc-like elements and so produce relative rotation of the said elements to effect the steering operation, the said spiral track being adapted to act as a stop for the said track engaging element precluding movement thereof in either radial direction by force applied thereto.

6. Steering gear comprising a steering wheel cam provided with a spiral slot therein, a fixed disc and a steering shaft disc mounted co-axially with and adjacent to the said steering wheel cam, reversely inclined curved slots in the said discs each having both radial and circumferential components, and a member extending throughout and simultaneously and slidably engaging all three said slots at their intersection, the sum of the angular extents of the slots in the two said discs being substantially smaller than the angular extent of the spiral slot in the steering wheel cam to provide a reduction ratio between the rotation of the steering wheel cam and the rotation of the steering shaft disc relatively to the fixed disc.

7. Steering gear comprising a steering wheel cam in disc form provided with a spiral slot therein, two discs mounted co-axially one on each side of the said steering wheel cam and rotatable in relation thereto, the two said discs being connected at their peripheries beyond the periphery of the steering wheel cam, one connected rigidly with a steering shaft and each provided with a curved slot having both radial and circumferential components, the said slots co-inciding as viewed in the axial direction, two discs mounted co-axially one on each side of the aforesaid assembly, connected together at their peripheries beyond the periphery of the said assembly, held fixed against rotation, and each provided with a curved slot having both radial and circumferential components, the said slots co-inciding as viewed in the axial direction but being reversed in inclination as compared with the slots in the discs in next inside relation to them, and a member slidably and simultaneously engaging all the slots, substantially as described.

FRANK HOWARD HAGUE.